US007752201B2

(12) United States Patent
Anderson et al.

(10) Patent No.: US 7,752,201 B2
(45) Date of Patent: Jul. 6, 2010

(54) RECOMMENDATION OF RELATED ELECTRONIC ASSETS BASED ON USER SEARCH BEHAVIOR

(75) Inventors: Blake Edward Anderson, Bothell, WA (US); Keiichiro Suzuki, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 11/803,018

(22) Filed: May 10, 2007

(65) Prior Publication Data

US 2008/0281808 A1    Nov. 13, 2008

(51) Int. Cl.
*G06F 7/00* (2006.01)
*G06F 17/30* (2006.01)

(52) U.S. Cl. .................. 707/731; 707/713; 707/758

(58) Field of Classification Search .............. 707/2, 707/5, 713, 731, 758
See application file for complete search history.

(56) References Cited

U.S. PATENT DOCUMENTS

| 5,201,047 | A | * | 4/1993 | Maki et al. .................... 1/1 |
| 5,241,671 | A | | 8/1993 | Reed ........................... 395/600 |
| 5,652,880 | A | | 7/1997 | Seagraves ................... 395/614 |
| 5,724,571 | A | * | 3/1998 | Woods .......................... 707/5 |
| 5,855,015 | A | | 12/1998 | Shoham |
| 5,864,845 | A | | 1/1999 | Voorhees ........................ 707/5 |
| 6,006,225 | A | * | 12/1999 | Bowman et al. ................ 707/5 |
| 6,397,212 | B1 | | 5/2002 | Biffar ............................ 707/5 |
| 6,678,679 | B1 | | 1/2004 | Bradford |
| 6,732,088 | B1 | | 5/2004 | Glance ........................... 707/3 |
| 6,832,218 | B1 | * | 12/2004 | Emens et al. .................... 1/1 |
| 6,839,680 | B1 | | 1/2005 | Liu .............................. 705/10 |
| 7,062,487 | B1 | * | 6/2006 | Nagaishi et al. ................ 707/6 |
| 7,069,254 | B2 | | 6/2006 | Foulger ....................... 706/14 |
| 7,082,428 | B1 | | 7/2006 | Denny ........................... 707/5 |
| 7,092,936 | B1 | | 8/2006 | Alonso .......................... 707/3 |
| 7,117,208 | B2 | | 10/2006 | Tamayo .......................... 707/6 |

(Continued)

FOREIGN PATENT DOCUMENTS

EP         1-708-105 A1 * 10/2006

OTHER PUBLICATIONS

Glover, E. J., et al., "Improving Category Specific Web Search by Learning Query Modifications", Saint 2001, San Diego, CA, Jan. 8-12, 2001, pp. 23-31.*

(Continued)

*Primary Examiner*—Robert Stevens
(74) *Attorney, Agent, or Firm*—Merchant & Gould P.C.

(57) ABSTRACT

Recommendation of related assets based on user search behavior is provided. Relevance classifications assigned to search results in association with search strings that produced the search results may be used for providing a list of one or more searchable assets that may be relevant to a given search query. All pairings of two acceptable assets contained in a given search session may be marked as "See Also" candidates. If a given pairing appears in a search session more than a configurable threshold, the assets in the pairing may be established as "See Also" relationships. Subsequently, when a user conducts a search that produces a search result that is a member of a pairing established as a "See Also" relationship, the other asset in the pairing may be recommended to the searching user within the destination search result page after the user selects the search result for viewing.

20 Claims, 5 Drawing Sheets

U.S. PATENT DOCUMENTS

| | | | |
|---|---|---|---|
| 7,130,849 B2 | 10/2006 | Yayoi et al. | |
| 7,165,105 B2 | 1/2007 | Reiner | 709/224 |
| 7,283,997 B1 | 10/2007 | Howard, Jr. | |
| 7,424,469 B2 * | 9/2008 | Ratnaparkhi | 1/1 |
| 2002/0112048 A1 | 8/2002 | Gruyer | 709/224 |
| 2003/0014399 A1 | 1/2003 | Hansen | |
| 2003/0018626 A1 * | 1/2003 | Kay et al. | 707/3 |
| 2003/0144994 A1 | 7/2003 | Wen | |
| 2004/0260688 A1 * | 12/2004 | Gross | 707/3 |
| 2005/0071328 A1 | 3/2005 | Lawrence | |
| 2005/0125374 A1 * | 6/2005 | Curtis et al. | 707/1 |
| 2005/0125382 A1 | 6/2005 | Karnawat | |
| 2005/0125390 A1 | 6/2005 | Hurst-Hiller | 707/3 |
| 2005/0125391 A1 * | 6/2005 | Curtis et al. | 707/3 |
| 2005/0131866 A1 | 6/2005 | Badros | |
| 2005/0149504 A1 | 7/2005 | Ratnaparkhi | |
| 2005/0210024 A1 | 9/2005 | Hurst-Hiller | |
| 2005/0222987 A1 * | 10/2005 | Vadon | 707/3 |
| 2005/0228788 A1 * | 10/2005 | Dahn et al. | 707/3 |
| 2005/0234972 A1 * | 10/2005 | Zeng et al. | 707/103 R |
| 2005/0289140 A1 * | 12/2005 | Ford et al. | 707/5 |
| 2006/0026147 A1 * | 2/2006 | Cone et al. | 707/3 |
| 2006/0041548 A1 | 2/2006 | Parsons | 707/5 |
| 2006/0064411 A1 * | 3/2006 | Gross et al. | 707/3 |
| 2006/0085401 A1 * | 4/2006 | Anderson et al. | 707/3 |
| 2006/0224579 A1 * | 10/2006 | Zheng | 707/5 |
| 2006/0224583 A1 | 10/2006 | Fikes | 707/6 |
| 2006/0224587 A1 * | 10/2006 | Zamir et al. | 707/7 |
| 2006/0224608 A1 * | 10/2006 | Zamir et al. | 707/101 |
| 2006/0224938 A1 * | 10/2006 | Fikes et al. | 715/500 |
| 2006/0230040 A1 * | 10/2006 | Curtis et al. | 707/7 |
| 2006/0259861 A1 | 11/2006 | Watson | 715/705 |
| 2006/0259867 A1 | 11/2006 | Watson | 715/760 |
| 2006/0294095 A1 | 12/2006 | Berk | 707/6 |
| 2007/0005646 A1 | 1/2007 | Dumais | 707/104.1 |
| 2008/0140607 A1 * | 6/2008 | Chi et al. | 707/2 |
| 2008/0281809 A1 | 11/2008 | Anderson et al. | 707/5 |

OTHER PUBLICATIONS

Zhang, Benyu, et al., "Improving Web Search Results Using Affinity Graph", SIGIR '05, Salvador, Brazil, Aug. 15-19, 2005, pp. 504-511.*

Agichtein, Eugene, et al., "Improving Web Search Ranking by Incorporating User Behavior Information", SIGIR '06, Seattle, WA, Aug. 6-11, 2006, pp. 19-26.*

Zamir, Oren, et al., "Grouper: A Dynamic Clustering Interface to Web Search Results", Proc. Of the 18th International Conf. on the World Wide Web, Toronto, Canada, © 1999, pp. 1-15.*

Anyanwu, Kemafor, et al., "SemRank: Ranking Complex Relationship Search Results on the Semantic Web", WWW 2005, Chiba, Japan, May 10-14, 2005, pp. 117-127.*

Chekuri, Chandra, et al., "Web Search Using Automatic Classification", 6th World Wide Web Conference, © 1997, pp. 1-11.*

Leouski, Anton V., et al., "An Evaluation of Techniques for Clustering Search Results", Space & Naval Warfare Systems Center Report, Sponsors: NSF/LOC/DOC (EEC-9209623) and NRaD (Contract No. N66001-94-D-6054), © 2005, pp. i and 1-19.*

Smyth, Barry, et. al., "A Live-User Evaluation of Collaborative Web Search," Jul. 22, 2005, University College Dublin, Ireland, pp. 1-6, http://ijcai.org/papers/0680.pdf.

Mobasher, Bamshad, et. al., "Automatic Personalization Based on Web Usage Mining," Oct. 10, 2003, DePaul University, Chicago, IL and University of Minnesota, Minneapolis, MN, pp. 1-24, http://cybermetrics.cindoc/csic/es/cybermetrics/pdf/251.pdf.

Glance, Natalie S., "Community Search Assistant," Jan. 2001, Xerox Research Centre Europe, pp. 91-96, http://www.iuiconf.org/01pdf/2001-001-0015.pdf.

Bucklin, Randolph E., et. al. "A Model of Web Site Browsing Behavior Estimated on Clickstream Data," Aug. 2003, University of California—Los Angeles and University of Southern California, pp. 249-267, http://www.anderson.ucla.edu/faculty/randy.bucklin/papers/bucklinandsismeiro2003.pdf.

Liang, Ting-Peng, et. al., "Discovering User Interests from Web Browsing Behavior: An Application to Internet News Services," 2002, National Sun Yat-sen University, pp. 1-10, http://www.hicss.hawaii.edu/HICSS_35/HICSSpapers/PDFdocuments/INMIW07.pdf.

Claypool, Mark, et. al., "Inferring User Interest," Aug. 31, 2001, Worcester Polytechnic Institute, pp. 1-17, http://www.cs.wpi.edu/~claypool/papers/iui/iui.ps. gz.

Manavoglu, Eren, et. al., "Probabilistic User Behavior Models," 2003, Pennsylvania State University and Yahoo Inc., pp. 1-8, http://clgiles.ist.psu.edu/papers/ICDM-2003-probabilistic-user.pdf.

US Final Office Action mailed Dec. 22, 2009 for U.S. Appl. No. 11/803,019, 15 pages.

US Non-Final Office Action mailed Jun. 4, 2009 for U.S. Appl. No. 11/803,019, 16 pages.

* cited by examiner

RECOMMENDATION OF RELATED ELECTRONIC ASSETS BASED ON USER SEARCH BEHAVIOR

RELATED APPLICATIONS

This application is related to U.S. patent application Ser. No. 11/803,019, filed May 10, 2007, and entitled, "AUTOMATED ANALYSIS OF USER SEARCH BEHAVIOR," which is hereby incorporated by reference in its entirety.

BACKGROUND

With the advent of search functions across distributed computing networks, such as the Internet, a variety of searchable assets, for example, web pages, websites, and associated content, are available to searching users. Providers of such content and providers of search mechanisms, such as Internet browsing applications, often desire user feedback on how acceptable or useful a given web asset is in relation to an associated search query. For example, a developer of a web browsing application may desire user feedback on the acceptability and quality of search results provided in response to associated search queries so that the developer may improve the search functionality of the web browsing application. Prior systems have relied on explicit feedback from searching users, but unfortunately, a very small number of users typically respond to requests for explicit feedback, and thus, the small quantity of feedback responses may cause the reliability of such feedback to be suspect. Prior systems have also relied on click-through information, including information on whether a user actually selects a given search result and/or selects additional items in a given search result, but whether a user selects a given search result and any additional items in a given search result may not be indicative of satisfaction with the selected search result.

In addition when users browse to a particular web asset for information or assistance on a given topic, the users often find part of the information they seek in one document, but they have to do additional browsing or searching to find other pieces of needed information in other web assets. Unfortunately, this typically results in users being required to conduct a number of searches to find all needed information, often having to re-browse to web assets they have previously located and dismissed.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve and above and other problems by providing automated analysis of user search behavior. According to an embodiment, data on user searches is maintained in a user search database, including such data as search queries (search strings) used to conduct a search, user behavior on a selected search result, for example, printing a given search result, etc., and any explicit feedback provided by a searching user on a selected search result, for example, a content rating.

Search activity for one or more users is organized into search sessions where a typical session represents searches directed to a single user search topic. Statistics or relevance factors are determined for each search result included in a given session where the statistics or relevance factors provide an indication of user satisfaction with particular search results included in the session. Examples of relevant statistics or factors include the time spent viewing a particular search result, how a user exited from a selected search result, a sequence in which a user views particular search results, etc.

The relevance factors or statistics determined for each search result are analyzed via a relevance classification module for classifying each search result in terms of its relevance to the search initiated by the searching user. The result of the relevance classification may assign a relevance classification and associated confidence level to each analyzed search result. For example, a given search result may be classified as acceptable, (correct response to a search query), unacceptable (incorrect response to a search query), or partially acceptable (the search result did not entirely answer a search query, but provided partial information). Relevance classifications for each analyzed search result may then be stored for future use, for example, for diagnostic analysis of the operation of a given search mechanism.

According to another embodiment, the relevance classifications assigned to various search results in association with search strings that produced the search results may be used for providing a list of one or more searchable assets that may be relevant to a given search query. Relevance classification data for a given search session may be parsed to determine whether any two search results in a given search session have been classified as acceptable in relation to an associated search query. All pairings of two acceptable search results contained in a given search session are marked as "See Also" candidates, and a "See Also" record for each asset (search result) pairing is created. In addition, a "See Also User" record is created for each user associated with each asset pairing. A count is maintained for each time a given asset pairing is found in a search session. Once the count exceeds a prescribed threshold, the two web assets (search results) comprising the pairing are established as "See Also" relationships. Subsequently, when a user conducts a search that produces a search result that is a member of an asset pairing established as a "See Also" relationship, the other search result in the pairing may be recommended to the searching user in response to the search query. Alternatively, the other search result in the pairing may be recommended to the searching user within the destination search result page after the user selects the search result for viewing.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
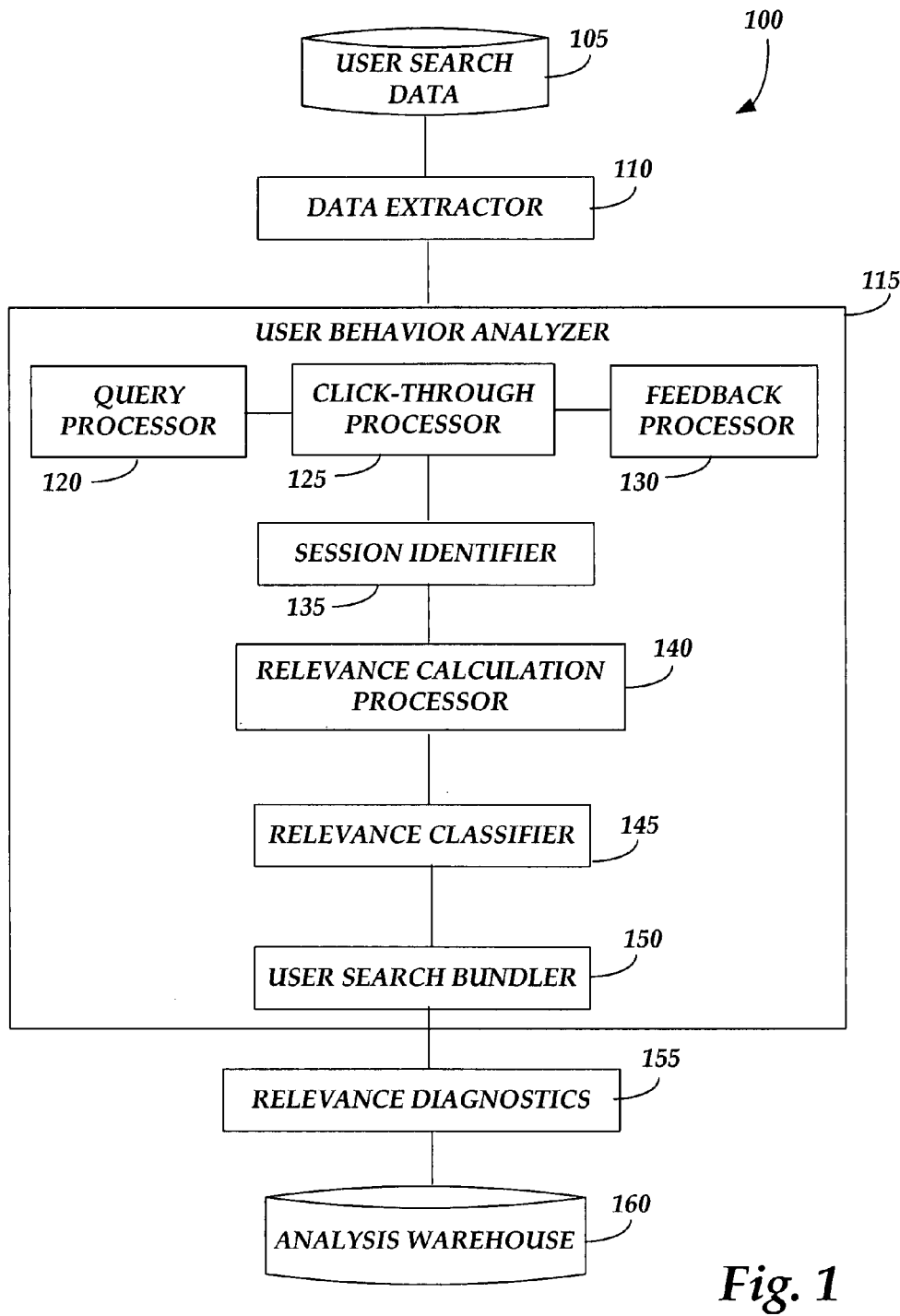
FIG. 1 is a simplified block diagram illustrating an architecture of a system for automated analysis of user search behavior.

As briefly described above, embodiments of the present invention are directed to analysis of user search behavior and to providing a list of one or more searchable assets that may be relevant to a given search query. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified block diagram illustrating an architecture of a system for automated analysis of user search behavior. The user search behavior analysis system 100, illustrated in FIG. 1, is operative to analyze search behavior for one or more users and for determining the relevance of search results to associated search queries. According to one embodiment, the system 100 provides a framework to estimate user satisfaction with Internet-based search results based on user behavior (implicit feedback) in combination with explicit user feedback. Predicted user satisfaction in combination with explicit user feedback may provide metrics for measuring a user's satisfaction with search results and for giving a developer of a searchable content item or developer of a search mechanism important feedback on how to improve the mapping between search query terms and resulting search content. According to an embodiment, the components of the system 100, described below, may operate as a single application comprised of each of the described components, or components of the system may be located in disparate locations and may communicate with each other via a distributed computing network, such as the Internet or an intranet.

Referring still to FIG. 1, the system 100 includes a user search database in which data on user search behavior is stored. According to an embodiment, the database 105 may be updated on a continuous or periodic basis during run time of a given search mechanism, for example, an Internet browsing application. Data that may be logged in the database 105 may include any data associated with a user and the user's behavior during the search of one or more web-based assets (for example, web pages, websites, and associated content) and may include data associated with many users performing searches. For example, data stored in the database 105 may include an identification of a searching user, executed search queries, for example, search strings, entered by a searching user, click-through behavior associated with user actions on a given web asset, for example, whether the user opens a given asset, whether the user prints a given asset, whether the user selects links to other web assets embedded in a given asset, whether the user electronically mails or otherwise sends a link to a given asset to another user, whether the user adds a selected asset to a favorites list, whether the user applies any software functionality, for example, formatting to a selected web asset, etc.

In addition, any explicit feedback a user provides has on a given asset may be stored in the database 105. For example, a user may be requested to complete a survey for rating an asset, for example, on a scale from one to five, good, medium, bad, etc. Such explicit feedback systems may allow a user to rate the relevance of a selected web asset to the user's search query, or such feedback systems may simply allow the user to rate the quality of the web asset. In addition, a user may be provided an opportunity to provide textual comments on the relevance of a given web asset to the user's search or on the quality or usefulness of a given web asset.

According to an embodiment, data logged in the database 105 for a given searching user may be stored and subsequently analyzed (as described below) in "packets" of data. A packet of data may be comprised of user searching and search result use behaviors logged during the user's searching operations over a set amount of time. The analysis described herein on user search behavior may be performed on the user behavior of multiple users, but according to one embodiment, user search behavior analysis is performed on a user by user basis based on packets of data associated with given users.

Referring still to FIG. 1, the data extractor module 110 is operative to extract user search data from the database 105 and for preparing the data for subsequent user search behavior analysis. The data extractor module 110 may perform data cleaning and spam detection on extracted data. In addition, the data extractor module 110 may transform batched data contained in the database 105 into a format useful for subsequent processing. For example, data contained in the database 105 may be transformed into a format such as the Extensible Markup Language (XML) format for use in a subsequent data analysis application.

The user behavior analyzer 115 is operative to process extracted user search behavior data so that a relevance classification may be applied to each search result obtained in response to a given search query. The user behavior analyzer 115 may invoke a query processor module 120 for reading the data obtained from the database 105 related to user searches. For example, the query processor may read data including specific search results stored in the database 105 that are responsive to associated search queries. The user behavior analyzer 115 may invoke a click-through processor module 125 that is operative to read data extracted from the database 105 associated with user behavior on selected web assets, for example, whether the user opens a given asset, whether the user prints a given asset, whether the user selects links to other web assets embedded in a given asset, whether the user electronically mails or otherwise sends a link to a given asset to another user, whether the user adds a selected asset to a favorites list, whether the user applies any software functionality, for example, formatting to a selected web asset, etc. The user behavior analyzer 115 may invoke a feedback processor module 130 for reading data extracted from the database 105 related to explicit user feedback on a given web asset.

The session identifier module 135 may be invoked by the user behavior analyzer 115 for grouping user search behavior into sessions. According to an embodiment, one method of grouping user behavior into sessions is based on a time gap between consecutive user searches and based on the common web assets of the search results. As should be appreciated, other methods of grouping user search behavior into sessions may be employed. According to one embodiment, every user search is initially assigned a unique session identification. Searching behaviors (individual searches and actions on searched assets) may be grouped in sessions based on the time gap between two consecutive searching behaviors and based on the common assets in a result displayed list containing search results displayed in response to the search behaviors. The threshold for the time gap between consecutive searching behaviors may be increased proportionally based on the number of common assets between the two consecutive search behaviors.

The relevance calculation processor module 140 may be invoked by the user behavior analyzer 115 for calculating a set of relevance factors for each search result that a user clicks through and for storing relevance factors in the user behavior analyzer 115. If the user does not give explicit feedback for a given search result, a relevance classifier module 145 (described below) may use the relevance factors associated with the search result to determine if the user was satisfied with the search result or not. A description of a number of relevance factors is set out in Table 1 below. As should be appreciated the relevance factors listed in Table 1 are for purposes of example only and are not exhaustive of all relevance factors that may be used to determine user satisfaction with a given search result as described herein.

According to one embodiment, the NormalizedAvgAssetDwellTime, NormalizedAvgSatDwellTime, and NormalizedAvgDSatDwellTime relevance factors (listed in Table 1 above) may be computed as follows:

1. NormalizedAvgAssetDwellTime=DwellTime−MeanDwellTimeAsset
   NormalizedAvgSatDwellTime=DwellTime−MeanDwellTimeSATAsset
   NormalizedAvgDSatDwellTime=DwellTime−MeanDwellTimeDSATAsset 2. The LogDwellTimeUpperBound (LogUTUB) is an upper bound to be used to remove outliers when computing MeanDwellTime, MeanDwellTimeSATAsset, and MeanDwellTimeDSATAsset for each asset. LogDwellTimeUpperBound=Log(Avg(RawDwellTime)+2*STDEV(RawDwellTime))

TABLE 1

| Name | Description |
| --- | --- |
| LastViewStartedDateTime | Date and time that the last ViewStarted event happened for a specific result. |
| LastViewEndedDateTime | Date and time that the last ViewEnded event happened for a specific result. |
| RatingPresent | True if there is a rating present, false if not. |
| ResultViewCountForSearch | The number of results viewed for the UserSearch associated with a specific result. |
| ResultClickCount | The number of selected events associated with a specific result. |
| ExitType | The manner in which the user exited viewing a specific result. This takes advantage of the session identification processor module. There are three possible values:<br>IssueAnotherQuery - User issued another query after viewing result.<br>ViewAnotherResult - User viewed another result after viewing current result.<br>Finish - There were no more behaviors within this session for the user after viewing this result. |
| ViewSequence | The order in which the user viewed a specific Result within a UserSearch. |
| EntryPoint | The EntryPoint for the UserSearch associated with a specific result. |
| QueryCultureName | Name of the QueryCulture for the UserSearch associated with a specific result. |
| LastViewOfSearch | True if a specific Result is the last one viewed in the UserSearch, otherwise false. |
| FirstViewStartedDateTime | Date and time that the first ViewStarted event happened for a specific result. |
| DifferentCulture | True if a specific result has a different QueryCulture record associated with it than its parent UserSearch, otherwise false. |
| ResultsAfter | The number of results that were viewed after a specific result within the UserSearch. |
| SecondsFromSearchStarted | The number of seconds that elapsed between issuing the query and viewing the specific result. |
| QueryLanguageName | Name of the QueryCulture for the UserSearch associated with the result. |
| DisplaySequence | The order in which a specific result was displayed. |
| ExplicitJudgment | Explicit Accept/Reject/Explore judgment. |
| RawDwellTime | The difference between the LastViewStartedDateTime and FirstFeedbackResponseDateTime, or The difference between the LastViewStartedDateTime and LastViewEndedDateTime. |
| DwellTime | Log(RawDwellTime)<br>RawDwellTime is transformed to logarithm space because the long tail in RawDwell time distribution distorts the calculation of average RawDwellTime. |
| NormalizedAvgAssetDwellTime<br>NormalizedAvgSatDwellTime<br>NormalizedAvgDSatDwellTime | See the Normalized Asset Dwell Time section below for details. |

3. MeanDwellTimeAsset is the average DwellTime for Results which are associated with an asset. Outliers are removed from the average calculation using the following filter DwellTime<=LogDwellTimeUpperBound.
4. MeanDwellTimeSATAsset is the average DwellTime for Results which are associated with an asset and have explicit satisfaction feedbacks. Outliers are removed from the average calculation using the following filter DwellTime<=LogDwellTimeUpperBound. The average is calculated when there are at least 3 explicit satisfaction feedbacks associated with an asset.
5. MeanDwellTimeDSATAsset is the average DwellTime for Results which are associated with an asset and have explicit dissatisfaction feedbacks. Outliers are removed from the average calculation using the following filter DwellTime<=LogDwellTimeUpperBound. The average is calculated when there are at least 3 explicit dissatisfaction feedbacks associated with an asset.

According to an embodiment, all relevance factors listed in Table 1 above are computed except NormalizedAvgAssetDwellTime, NormalizedAvgSatDwellTime, and NormalizedAvgDSatDwellTime. The computed relevance factors are stored by the user behavior analyzer which then computes the NormalizedAvgAssetDwellTime, NormalizedAvgSatDwellTime, and NormalizedAvgDSatDwellTime as described above.

A relevance classifier module 145 is operative to receive calculated relevance factors from the user behavior analyzer 115 for classifying each clicked-through search result in terms of its relevance to an associated search query. According to an embodiment, the relevance classifier module produces one of three "judgments" about the relevance of a given search result to an associated search query along with a confidence level (from 0 to 0.99) for each associated judgment. According to an embodiment, a confidence level of 1.0 means that the user provided explicit feedback as to the relevance and/or quality of a given search result. Confidence levels for relevance judgments may be computed based on how closely a set of relevance factors for a search result having no explicit feedback approximates the relevance factors for a search result having explicit feedback. In addition, the confidence level may be based on the number and values (for example, dwell time) of each of the available factors. That is, the more "acceptable" relevance factors that are applicable and the better the values (for example, longer dwell time), the higher may be the confidence level.

The "judgments" that may be produced by the relevance classifier module 145 include: (1) "Accept" meaning that the user accepted this search result as the correct response to the associated search query; (2) "Reject" meaning that the user rejected this search result as the correct response to the associated search query; and (3) "Explore" meaning that this search result did not entirely answer the associated search query, but the search result provided partial information to the associated search query.

The input to the relevance classifier module includes the relevance factors described above provided for a given search result. The relevance factors of those search results having explicit feedback may be used to teach or train the relevance classifier module as to how to classify search results having no explicit feedback. For example, if for a given search result was explicitly classified by a user as "Accepted" via a rating system to which the user responded, then the user behaviors exhibited by the user for that search result may be deemed to be associated with an acceptable search result. For example, if a user selected for viewing a given search result, dwelled on the result for a given time period, printed content from the result, followed by providing explicit feedback that the search result was acceptable, then the relevance classifier module may classify other search results as acceptable (judgment of "Accept") when similar user behavior is exhibited, but for which no explicit feedback is provided.

Similarly, user behavior (in terms of relevance factors) associated with a search result explicitly classified as "unacceptable" may be used to teach the relevance classifier module how to classify subsequent search results as unacceptable where no explicit feedback is available. In effect, user behavior profiles (combinations and values of relevance factors) may be created by the relevance classifier module for acceptable, unacceptable and partially acceptable search results based on different combinations and values of relevance factors associated with search results having explicit feedback.

According to an embodiment, the relevance classifier module 145 may be in the form of a SQL 2005 Decision Tree Data Mining Model that is trained using the relevance factors associated with search results having explicit feedback from a prescribed time period, for example, 90 days of historical user search data. The relevance classifier module 145 may send a DMX query to the data mining module in the SQL 2005 analysis server to receive the above described relevance classification. The data source of the DMX query includes the relevance factors received from the user behavior analyzer 115. The outputs of the DMX query are the classifications applied to the associated search results, described above. An example DMX query that may be sent to the data mining module is shown below in Table 2.

TABLE 2

```
SELECT
  t.[ResultID],
  (t.[ExplicitJudgment]) as [Actual],
  ([RC].[ExplicitJudgment]) as [Predicted],
  PredictHistogram([RC].[ExplicitJudgment])
From
  [RC]
PREDICTION JOIN
  OPENQUERY([AnalysisStager],
    'SELECT
      [ResultID],
      [ExplicitJudgment],
      [DwellTime],
      [NormalizedAvgAssetDwellTime],
      [RatingPresent],
      [NormalizedAvgSatDwellTime],
      [NormalizedAvgDSatDwellTime],
      [ResultViewCountForSearch],
      [ResultClickCount],
      [ExitType],
      [ViewSequence],
      [QueryCultureName],
      [LastViewOfSearch],
      [DifferentCulture],
      [ResultsAfter],
      [SecondsFromSearchStarted],
      [QueryLanguageName],
      [RawDwellTime],
      [DisplaySequence]
    FROM
      [RelevanceFactor] WHERE ExplicitJudgment IS NULL AND
      BatchID=1 ') AS t
  ON
    [RC].[DwellTime] = t.[DwellTime] AND
    [RC].[NormalizedAvgAssetDwellTime] =
      t.[NormalizedAvgAssetDwellTime] AND
    [RC].[RatingPresent] = t.[RatingPresent] AND
    [RC].[NormalizedAvgSatDwellTime] =
      t.[NormalizedAvgSatDwellTime] AND
    [RC].[NormalizedAvgDSatDwellTime] =
      t.[NormalizedAvgDSatDwellTime] AND
    [RC].[ResultViewCountForSearch] =
```

TABLE 2-continued

```
t.[ResultViewCountForSearch] AND
[RC].[ResultClickCount] = t.[ResultClickCount] AND
[RC].[ExitType] = t.[ExitType] AND
[RC].[ViewSequence] = t.[ViewSequence] AND
[RC].[QueryCultureName] = t.[QueryCultureName] AND
[RC].[LastViewOfSearch] = t.[LastViewOfSearch] AND
[RC].[DifferentCulture] = t.[DifferentCulture] AND
[RC].[ResultsAfter] = t.[ResultsAfter] AND
[RC].[SecondsFromSearchStarted] = t.[SecondsFromSearchStarted]
  AND
[RC].[QueryLanguageName] = t.[QueryLanguageName] AND
[RC].[RawDwellTime] = t.[RawDwellTime] AND
[RC].[DisplaySequence] = t.[DisplaySequence] AND
[RC].[ExplicitJudgment] = t.[ExplicitJudgment]
```

The user search bundler module 150 is operative to bundle user searches based on common normalized query terms. The user search bundler module 150 is illustrated in FIG. 1 after the relevance classifier module 145, but according to an embodiment, the functionality of the user search bundler 150 may be performed according to another sequence. For example, the user search bundler 150 may be placed before the session identifier 135, and the results of the user search bundler 150 may be used to assist in the process of grouping search behavior into sessions, as described above.

After the relevance of various search results has been classified by the relevance classifier module 145, the classifications may be utilized for a number of purposes, as described below. For example, the relevance diagnostics module 155 is operative to calculate diagnostic information based on a single user's behavior data. For example, if all search results obtained from a given search query result in a classification of "Reject," the relevance diagnostics module 155 may be operative to determine that a confidence level associated with a given search mechanism (for example, a given web browsing application), is low when obtaining search results for certain types of search queries, such as those responsible for the "Reject" classifications. For example, if a search query results in multiple "Reject" classifications, a diagnostic analysis may conclude that a search query of a particular grammatical structure or of a particular language type may result in unsatisfactory search results. In response, a developer of the search mechanism may provide functionality for offering a searching user an alternative search query grammatical structure or language type in response to input of a search query in a grammatical structure or according to a language type that is known to provide unsatisfactory results.

The analysis warehouse 160 is illustrative of a database for storing the analysis results of the system 100. According to an embodiment, the user behavior analyzer 115 may be operative to pack processing results from the system 100 for a given batch of user search behavior data according to a format such as the XML format. The data may then be sent to the analysis warehouse 160 for storage and for subsequent use in improving web asset content and for improving mapping between search query terms and web asset content. In addition, as will be described below, data produced by the user search behavior analysis system 100 and stored in the analysis warehouse 160 may be utilized by other applications that may make use of relevance classifications applied to various search results in association with search queries responsible for obtaining the search results.

Figure 2:
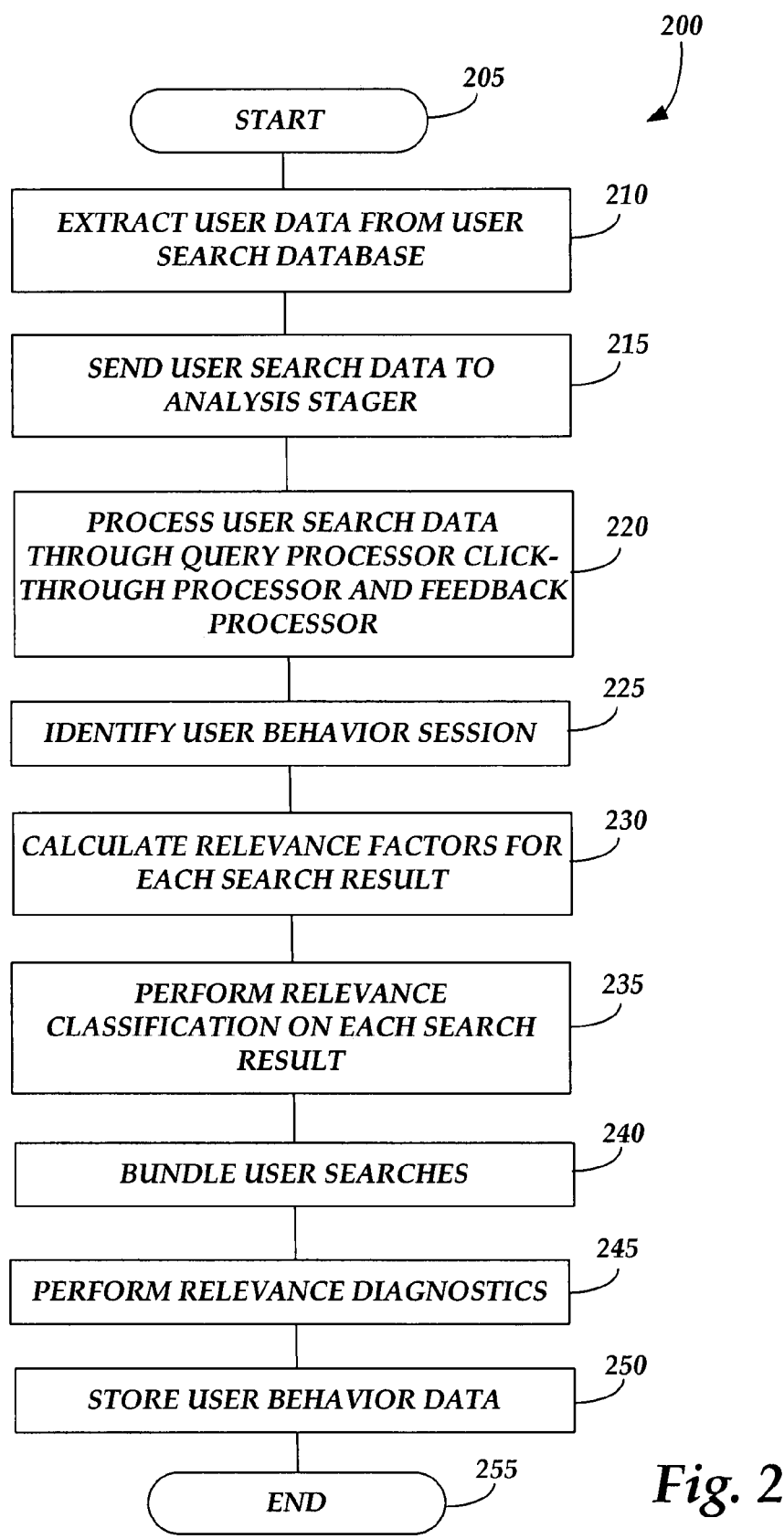
FIG. 2 is a logical flow diagram illustrating a method for analyzing user search behavior.

Having described an architecture for a system for analyzing user search behavior above with reference to FIG. 1, it is advantageous to further describe embodiments of the present invention with respect to an example operation of the user search behavior analysis system 100. FIG. 2 is a logical flow diagram illustrating a method for analyzing user search behavior. For purposes of discussion of the example operation illustrated in FIG. 2 consider, for example, that a user of an Internet browsing application, such as INTERNET EXPLORER® manufactured by MICROSOFT CORPORATION, browses to a number of websites during a searching session searching for information that is relevant to a topic of interest to the searching user. After the user enters a search query directed to the topic of interest, a number of web assets (for example, web pages, websites, and other Internet-based content) are displayed to the user via the user's Internet browsing application.

As the user selects various displayed web assets, data on the user's behavior is stored in the user search database 105, described above. For example, the search queries entered by the user are stored in the database 105. Each search result responsive to the search queries entered by the user is stored in the database 105. Each search result selected for viewing by the user is stored in the database 105. When the user selects a particular web asset, a start time of the user's viewing of the selected asset is stored and when the user exits viewing of the selected web asset, an end time for the user's viewing is stored. The behavior of the user while viewing the selected web asset is also stored. For example, if the user is asked to provide explicit feedback on a particular web asset, and the user responds to the feedback request, any explicit feedback provided by the user will be stored at the database 105. That is, any behavior of the user during the searching session applicable to the relevance factors described above will be stored for the user's searching behavior in the database 105.

The method 200, illustrated in FIG. 2, begins at start operation 205 and proceeds to operation 210 where the user search behavior analysis system 100 extracts user search data from the user search database 105 for running an analysis on the search behavior of the user during the user's search operation. The method then proceeds to operation 215 where the user search data extracted from the database 105 is sent to the user behavior analyzer 115, as described above with reference to FIG. 1. At operation 220, the user behavior analyzer 115 sends data extracted from the database 105 to each of the query processor module 120, the click-through processor module 125 and the feedback processor module 130. As described above with reference to FIG. 1, each of these modules reads data extracted from the database 105 applicable to search queries entered, user behavior after click-through to a particular web asset, and explicit user feedback, respectively.

At operation 225, the user behavior analyzer supplies the session identification module 135 with data associated with the start-times and end-times associated with various search queries. In response, based on the time gap between consecutive search queries entered by the searching user, the session identification module 135 establishes searching sessions and groups various consecutive search operations into identified search sessions so that the system 100 may analyze user search behavior for those search queries run and behavior exhibited by the searching user during identified sessions.

At operation 230, the user behavior analyzer 115 supplies data read from each of the processors 120, 125, 130 for a given session identified by the session identifier module 135 to the relevance calculation processor 140. As described above, the relevance calculation processor calculates a number of relevance factors from the user behavior data extracted from the database 105 and processed by each of the processor modules 120, 125, 130.

At operation 235, the relevance factors calculated by the relevance calculation processor module are passed to the relevance classifier module 145 for calculating a relevance judgment and confidence level for each search result grouped into a given search session. As described above, according to one embodiment, operation 235 is performed by passing the relevance factors to a SQL Decision Tree Data Mining Model that may be used for classifying each of the search results as one of three relevance judgments, including "Accept," "Reject," or "Explore." In addition, for each relevance judgment, a confidence level may be established by the relevance classifier module for indicating the confidence with which the relevance judgment is assigned to a particular search result based on the relevance factors calculated for the search result. As described above, for any search result for which the searching user provided explicit feedback, a confidence level of 1.0 may be assigned to the relevance judgment.

At operation 240, user search data is bundled based on common normalized query terms. As described above, operation of the user search bundler may occur at other times in the process illustrated in FIG. 2. For example, operation 240 may be performed prior to operation 225, and the results of operation 240 may be used to assist in the process of grouping search behavior into sessions.

As described above, after the relevance of various search results has been classified by the relevance classifier module 145, the classifications may be utilized for a number of purposes. For example, at operation 245, relevance diagnostics may be performed based on the relevance classifications assigned to search results by the system 100. As described above, relevance diagnostics may include modification of the programming of a given search mechanism for how the search mechanism processes search queries for returning relevant search results. In addition, relevance diagnostics may include passing information prepared by the system 100 to other applications that may be operative to utilize relevance classification data for providing additional search functionality and assistance. At operation 250, the user behavior analysis data is stored at the analysis warehouse 160 for subsequent use. The method ends at operation 255.

Recommendation of Related Assets

As described above, after relevance classifications are established for individual search results applicable to search queries conducted during a user's search session, the classifications may be used for search relevance diagnostics and by other applications that are operative to use the relevance classifications to provide additional assistance in search operations. According to one embodiment, the relevance classifications assigned to search results, as described above, may be utilized for directing a searching user to web assets that are determined to be related to a given web asset presently provided to the user in response to a search query. According to this embodiment, in order to reduce the amount of re-searching or re-browsing the searching user must do, user search sessions identified by the user search behavior system 100 may be analyzed to find search results that are related to each other. Thus, when a searching user finds a search result that suits his/her searching needs, other related web assets may be recommended to the user that have been found to be acceptable or satisfactory search results by this or other users when a particular search topic has been searched. As will be described below, according to embodiments of the present invention, when the user obtains a search result based on a given search query, other web assets that have been determined to be related to the search result presently provided to the searching user are recommended to the searching user in a "See Also" recommendation list from which the user may select related search results.

Figure 3:
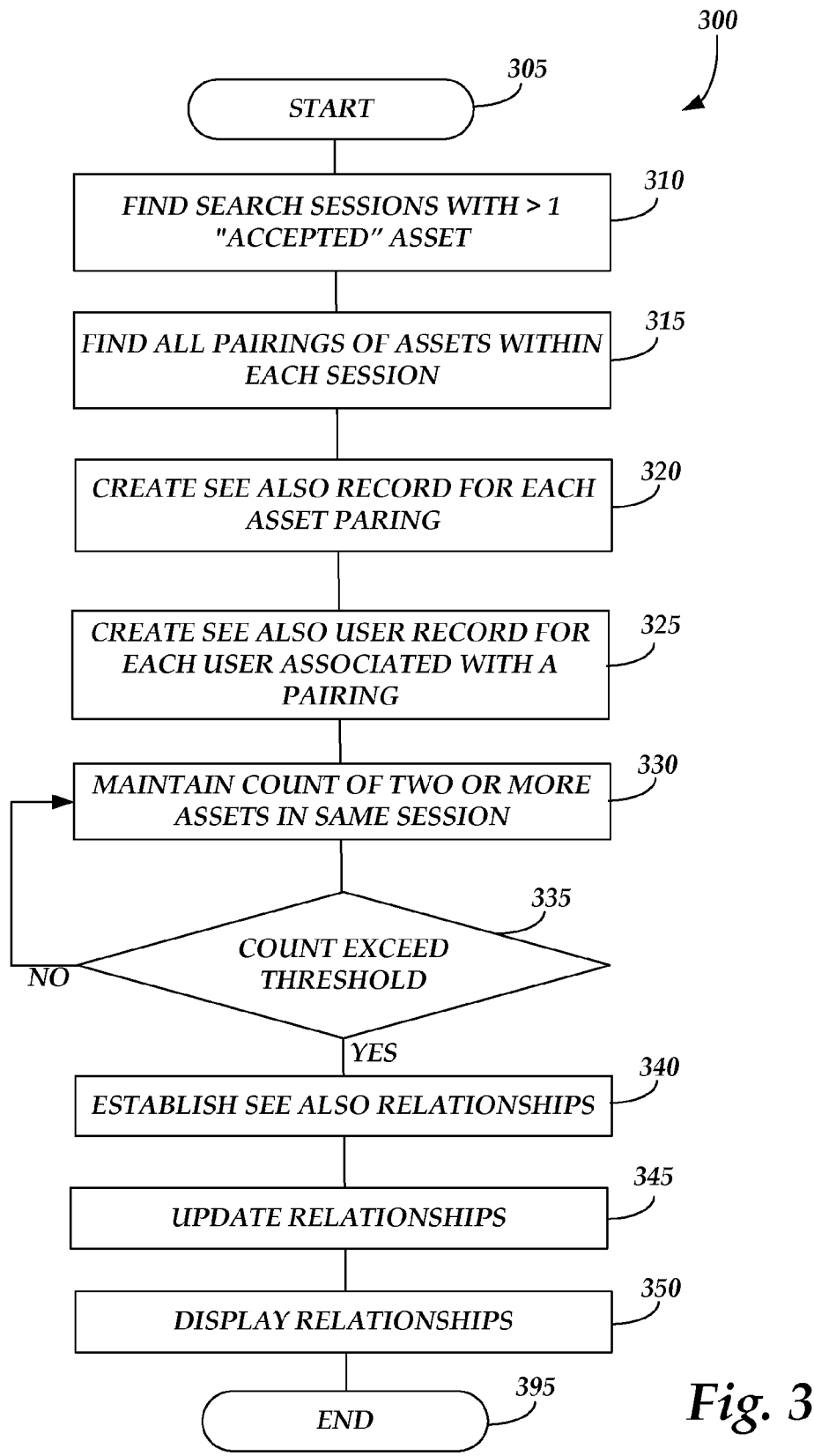
FIG. 3 is a logical flow diagram illustrating a method for providing a "See Also" web asset related to an obtained search result.

FIG. 3 is a logical flow diagram illustrating a method for providing a "See Also" web asset related to an obtained search result. The method 300 begins at start operation 305 and proceeds to operation 310 at which the search sessions identified by the user search behavior analysis system 100 are parsed to find search sessions having more than one search result that is classified as "Accept" by the relevance classifier module.

At operation 315 pairings of "Accept" search results (web assets) found in each search session are identified and are classified as recommended related search results candidates (also referred to herein as "See Also" candidates). According to one embodiment, only those "Accept" search results having an associated confidence level above a configurable threshold will be classified as a member of a "See Also" candidate pairing. For example, a default threshold confidence level of 0.5 may be set, below which associated search results are not considered "See Also" candidates. For example, if Session1 had an "Accept" on Asset1, Asset2, and Asset3, then the following "See Also" candidate pairings may be established if each asset meets or exceeds the required confidence level. As can be seen below, the pairing represent the statistical permutations of the "Accept" assets in the associated session that meet of exceed the required confidence level.

Pairing1=Asset1–Asset2
Pairing2=Asset1–Asset3
Pairing3=Asset2–Asset1
Pairing4=Asset2–Asset3
Pairing5=Asset3–Asset1
Pairing6=Asset3–Asset2

Figure 4:
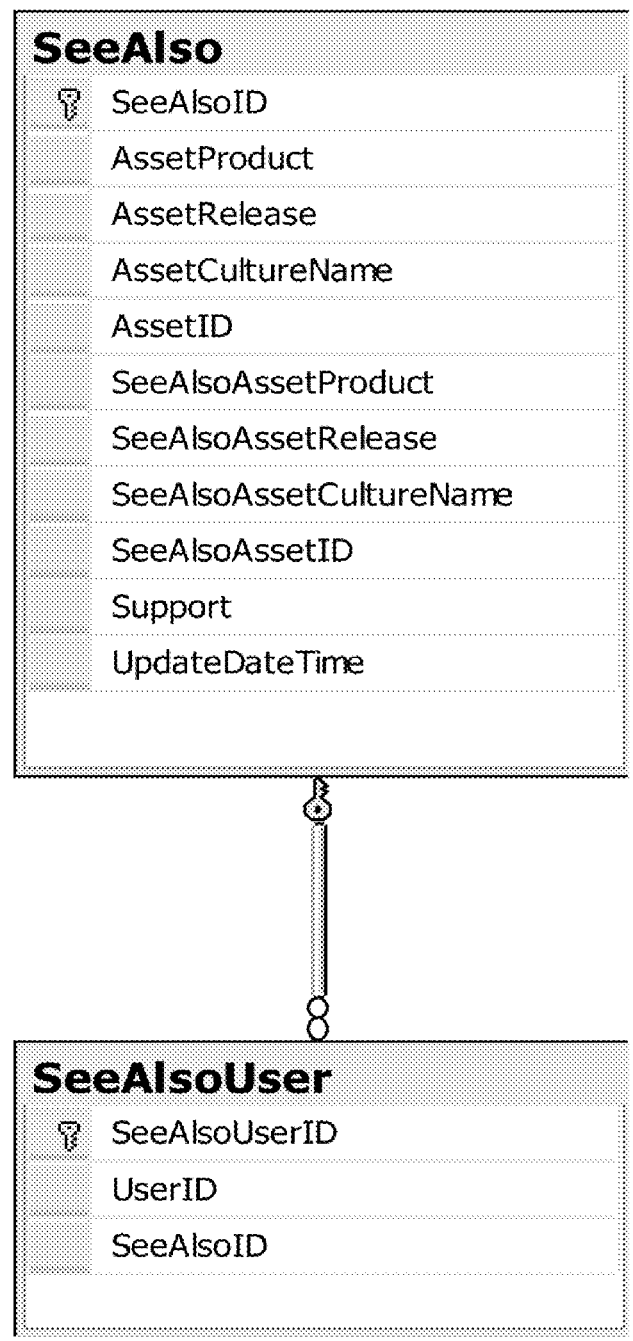
FIG. 4 illustrates a data structure for "See Also" and "See Also User" data associated with related search results.

At operation 320, a "See Also" record (data structure) is created for each search result (web asset) pairing, as illustrated and described below with reference to FIG. 4. That is, a data record is created that subsequently may be used for recommending a web asset contained in a given pairing to a searching user who has obtained the other web asset contained in the pairing based on a given search query.

At operation 325, a "See Also User" record is created for each user that supports (associated with) a given pairing. For example, for a given search result pairing, a user record may be created identifying users associated with each identified search result (web asset). By identifying users associated with each pairing of web assets, a count may be maintained for users supporting or being associated with a given pairing. According to one embodiment, a given user may only be counted as supporting or being associated with a given web asset pairing once to reduce the possibility that two web assets comprising a pairing of web assets may be artificially associated with each other based on the searching behavior of a single user who may have exhibited searching behavior to cause a pairing of web assets to be both accepted and considered as related where other users may not typically exhibit searching behavior for the two web assets that would cause the web assets to be considered accepted and related, as described herein.

At operation 330, a count is maintained for each time a pairing of web assets appear in the same search session for any parsed search session for any searching user. Once the count for appearance of the same pairing exceeds a configurable threshold, the pairing may be established as having a "See Also" relationship. For example, a configurable count may be set at the occurrence of the same web asset pairing five or more times in various search sessions.

At operation 335, a determination is made as to whether the configurable count for the occurrence of a given web asset pairing has been exceeded in various search sessions established by the user search analysis system 100. If the count has not exceeded the configurable threshold, the method proceeds back to operation 330, and the maintenance of the count for occurrences of the particular web asset pairing is continued. If the count of occurrences of the same web asset pairing exceeds the configurable threshold, the method proceeds to operation 340, and a "See Also" relationship is established for the two web assets making up the asset pairing.

At operation 345, a searching user initiates a search query on a given topic using an Internet browsing application of the user's choice. For example, the searching user may enter a topic for which the user is conducting research. If in response to the user's search query, a search result is returned that is identified as part of a web asset pairing, then the other web asset contained in the identified asset pairing may be recommended to the user to assist the user in his/her current search operation. For example, if a given search result obtained by a searching user is identified as having a "See Also" relationship with Asset2 in a first asset pairing, is identified as having a "See Also" relationship with Asset3 in a second asset pairing, and is identified as having a "See Also" relationship with Asset4 in a third asset pairing, then each of Asset2, Asset3, and Asset4 may be recommended to the user as assets (web pages, web sites and/or related content) the user may wish to browse or view in association with the present search result to which the user has browsed.

At operation 350, the "See Also" relationships may be displayed to the searching user. As should be appreciated, each of the "See Also" web assets may be displayed in a listing of search results, or each of the "See Also" assets may be displayed in a dialog, menu, or other user interface component to direct the user to the "See Also" relationships. For example, if the user selects Asset1 for viewing, a dialog or other user interface component may pop up on the user's computer display screen recommending the user to "See Also" Asset2 and Asset3 which have been identified as having "See Also" relationships (web asset pairings) with Asset1 (that is, the search result that has been selected by the searching user). Thus, the user's searching experience is greatly enhanced because the user is supplied with one or more web assets that have been determined to be related to a presently-selected web asset based on previous user searching behavior. Thus, the user is not required to view a particular search result (web asset), followed by additional searching in the hope of finding additional web assets that may be related to a presently selected and/or viewed web asset.

Embodiments of the invention are not restricted to the domain of searching. For example, if a user is browsing various web assets, the recommendations available according to the "See Also" relationships are still available. For example, if a user clicks through a table of contents and arrives at a particular asset, related assets may be provided so that the user does not have to return to the table of contents and re-browse. The method 300 ends operation 395.

As described above, a "See Also" record is created for each asset pairing found in each search session, and a "See Also User" record is created for each user associated with a given asset pairing. FIG. 4 illustrates a data structure for "See Also" and "See Also User" data associated with related search results. The "See Also" record stores the source asset and the related assets in the form of a four-part key. Thus, the "See Also" functionality described herein is not associated with a particular browsing application version. The record also includes a support column which includes a count of the "See Also User" records that support the association of the two assets stored in the record.

Operating Environment

Figure 5:
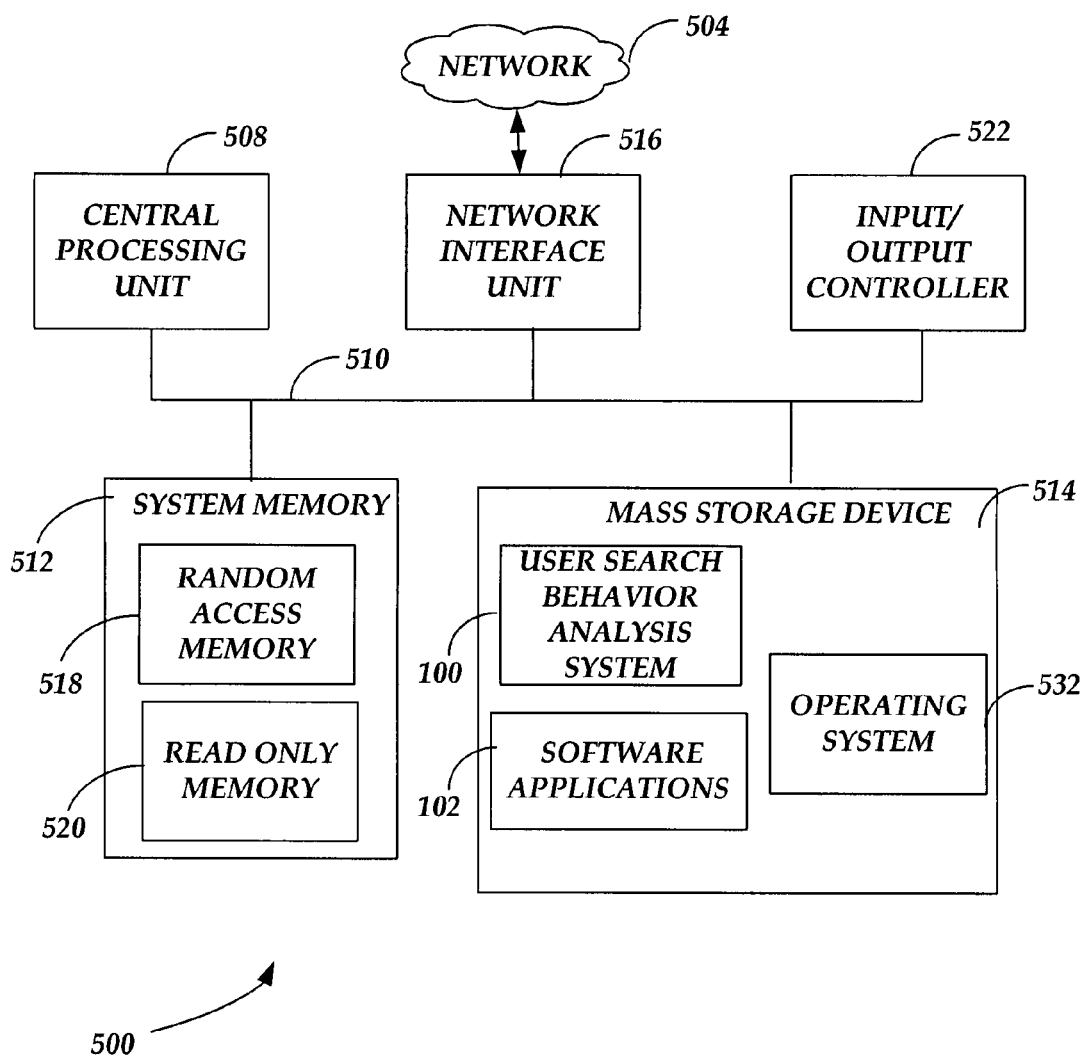
FIG. 5 is a simplified block diagram illustrating an example computing operating environment in which embodiments of the invention may be practiced.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 500 comprises a general purpose desktop, laptop, handheld, mobile or other type of computer (computing device) capable of executing one or more application programs. The computer 500 includes at least one central processing unit 508 ("CPU"), a system memory 512, including a random access memory 518 ("RAM") and a read-only memory ("ROM") 520, and a system bus 510 that couples the memory to the CPU 508. A basic input/output system containing the basic routines that help to transfer information between elements within the computer, such as during startup, is stored in the ROM 520. The computer 502 further includes a mass storage device 514 for storing an operating system 532, application programs, and other program modules.

The mass storage device 514 is connected to the CPU 508 through a mass storage controller (not shown) connected to the bus 510. The mass storage device 514 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed or utilized by the computer 500.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 500.

According to various embodiments of the invention, the computer 500 may operate in a networked environment using logical connections to remote computers through a network 504, such as a local network, the Internet, etc. for example. The computer 502 may connect to the network 504 through a network interface unit 516 connected to the bus 510. It should be appreciated that the network interface unit 516 may also be utilized to connect to other types of networks and remote computing systems. The computer 500 may also include an input/output controller 522 for receiving and processing input from a number of other devices, including a keyboard, mouse, etc. (not shown). Similarly, an input/output controller 522 may provide output to a display screen, a printer, or other type of output device.

As mentioned briefly above, a number of program modules and data files may be stored in the mass storage device 514 and RAM 518 of the computer 500, including an operating system 532 suitable for controlling the operation of a networked personal computer, such as the WINDOWS® operating systems from MICROSOFT CORPORATION of Redmond, Wash. The mass storage device 514 and RAM 518 may also store one or more program modules. In particular, the mass storage device 514 and the RAM 518 may store application programs, such as a software application, for example, a word processing application, a spreadsheet application, a slide presentation application, a database application, etc.

According to embodiments of the present invention, a user search behavior analysis system 100 is illustrated for analyzing user search behavior as described herein. Other client applications 102 may include an Internet browsing application, as described above, or other types of software applications, such as word processing applications, slide presentation applications, spreadsheet applications, desktop publishing applications, etc.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various embodiments, those of ordinary skill in the art will understand that many modifications may be made thereto within the scope of the claims that follow. Accordingly, it is not intended that the scope of the invention in any way be limited by the above description, but instead be determined entirely by reference to the claims that follow.

We claim:

1. A method of providing related search assets to an obtained search asset, the method comprising:
   providing a relevance classification for each search asset in a plurality of sessions,
      wherein for each search asset in the plurality of sessions, the relevance classification for the search asset is based on a relevance of the search asset to a search query that was used to locate the search asset, and
      wherein a search asset is an acceptable search asset when the search asset has a relevance classification indicating that the search asset is a correct response to the search query;
   identifying, by a computer, a set of pairings, wherein for each session in the plurality of sessions, the set of pairings includes each pairing of acceptable search assets in the session; and
   when a given pairing appears in the set of pairings more than a configurable threshold count, establishing the two search assets comprising the given pairing as recommended related search assets.

2. The method of claim 1, further comprising when a search for one or more search assets obtains one of the two search assets comprising the given pairing and when the given pairing has been established as recommended related search assets, recommending the other of the two search assets comprising the given pairing to a searching user.

3. The method of claim 2, further comprising recommending the other of the two search assets comprising the given pairing to the searching user in a "See Also" list of recommended search assets.

4. The method of claim 1, further comprising maintaining a "See Also" data record for each pairing in the set of pairings.

5. The method of claim 4, further comprising maintaining a count in the "See Also" data record for the given pairing, the count indicating a number of users associated with the given pairing.

6. The method of claim 5, further comprising:
   maintaining a "See Also User" data record for each of the users associated with the given pairing;
   relating the "See Also User" data records for the users associated with the given pairing to the "See Also" data record for the given pairing; and
   wherein an appearance of the given pairing is not counted toward the configurable threshold count when the appearance is associated with a particular user and when another appearance of the given pairing is associated with the particular user and is counted toward the configurable threshold count, thereby preventing two search assets from being established as recommended related search assets based on a user behavior of a single user.

7. The method of claim 1, further comprising:
   prior to providing the relevance classification for each search asset in the plurality of sessions:
   calculating one or more relevance factors for each search asset in the plurality of sessions; and
   providing the relevance classification for each search asset based on the one or more relevance factors calculated for each search asset in the plurality of sessions.

8. The method of claim 7, wherein providing the relevance classification for each search asset based on the one or more relevance factors calculated for each search asset included in the plurality includes analyzing user behavior associated with a plurality of search assets for which explicit feedback is provided.

9. The method of claim 8, wherein analyzing user behavior associated with the plurality of search assets for which explicit feedback is provided includes determining a user behavior based on one or more relevance factors associated with a search asset for which explicit feedback is provided and for which the search asset is acceptable to a searching user.

10. The method of claim 9, wherein providing the relevance classification for each search asset based on the one or more relevance factors calculated for each search asset included in the plurality of sessions includes applying the user behavior to one or more relevance factors calculated for each search asset included in the plurality of sessions for classifying one or more search assets included in the plurality of sessions for which no explicit feedback is provided as acceptable.

11. A computer storage medium containing computer readable instructions for providing related search results to an obtained search result, the computer readable instructions, when executed, causing a computer to:
- group search results in a plurality of search results into a plurality of sessions, each search result in the plurality of search results being an asset identified in response to a search query in a plurality of search queries;
- for each session in the plurality of sessions;
  - for each search result in the session;
    - calculate one or more relevance factors for the search result, wherein the relevance factors for the search result indicate user satisfaction with the search result; and
    - provide a relevance classification for the search result based on the relevance factors for the search result, wherein the search result is an acceptable search result when the search result has a relevance classification that indicates that the search result is a correct response to a search query used to locate the search result;
  - identify a set of pairings, wherein for each session in the plurality of sessions, the set of pairings includes each pairing of acceptable search results included within the session; and
  - when a given pairing appears in the set of pairings more than a configurable threshold count, establish the two search results comprising the given pairing as recommended related search results.

12. The computer storage medium of claim 11, wherein when a search for one or more search results obtains one of the two search results comprising the given pairing and when the given pairing has been established as recommended related search results, the computer readable instructions, when executed, cause the computer to recommend the other of the two search results comprising the given pairing to a searching user.

13. The computer storage medium of claim 12, further comprising recommending the other of the two search results comprising the given pairing to the searching user in a "See Also" list of recommended search results.

14. The computer storage medium of claim 11, further comprising maintaining a "See Also" data record for each pairing in the set of pairings.

15. The computer storage medium of claim 14, further comprising maintaining a count in the "See Also" data record for the given pairing, the count indicating a number of users associated with the given pairing.

16. The computer storage medium of claim 15, wherein the computer readable instructions, when executed, further cause the computer to:
- maintain a "See Also User" data record for each of the users associated with the given pairing;
- relate the "See Also User" data record for the users associated with the given pairing to the "See Also" data record for the given pairing;
- wherein an appearance of the given pairing is not counted toward the configurable threshold count when the appearance is associated with a particular user and when another appearance of the given pairing is associated with the particular user and is counted toward to configurable threshold count, thereby preventing two search results from being established as recommended related search results based on a user behavior of a single user.

17. The computer storage medium of claim 11, wherein providing a relevance classification for each search result included in the session includes analyzing user behavior associated with the plurality of search results for which explicit feedback is provided.

18. The computer readable storage medium of claim 17, wherein analyzing user behavior associated with the plurality of search results for which explicit feedback is provided includes determining a user behavior based on one or more relevance factors associated with a search result for which explicit feedback is provided and for which the search result is acceptable to a searching user.

19. The computer storage medium of claim 18, wherein providing the relevance classification for each search result in the session based on a relevance of each search result to a search query that was used to locate each search result includes applying the user behavior to one or more relevance factors calculated for each search result in the session for classifying one or more search results in the session for which no explicit feedback is provided as acceptable.

20. A computer storage medium containing computer readable instructions for providing related search results to an obtained search result, the computer readable instructions, when executed by a computer, cause the computer to:
- group search results in a plurality of search results into a plurality of sessions, each search result in the plurality of search results being an asset identified in response to a search query in a plurality of search queries;
- for each session in a plurality of sessions:
  - for each search result in the session:
    - calculate one or more relevance factors for the search result, wherein the relevance factors for the search result indicate user satisfaction with the search result;
    - provide a relevance classification for the search result based on the relevance factors for the search result and based on user behavior associated with search results in the session for which explicit feedback is provided, wherein the search result is an acceptable search result when the search result has a relevance classification that indicates that the search result is a correct response to a search query used to locate the search result;
- find a plurality of sessions having more than one search result classified as an acceptable search result;
- identify a set of pairings, wherein for each session in the plurality sessions having more than one search result classified as an acceptable search result, the set of pairings includes each pairing of acceptable search results included within the session;
- maintain a user data record for each user associated with a given pairing in the set of pairings;
- maintain a "See Also" data record for the given pairing, the "See Also" data record for the given pairing comprising a count indicating a number of the users associated with the given pairing;
- when the count in the "See Also" data record for the given pairing is more than a configurable threshold count, establish the two search results comprising the given pairing as recommended related search results; and
- when a search for one or more search results obtains one of the two search results comprising the given pairing and when the given pairing has been established as recommended related search results, recommending the other of the two search results comprising the given pairing to a searching user.

* * * * *

UNITED STATES PATENT AND TRADEMARK OFFICE
CERTIFICATE OF CORRECTION

PATENT NO. : 7,752,201 B2  
APPLICATION NO. : 11/803018  
DATED : July 6, 2010  
INVENTOR(S) : Blake Edward Anderson et al.

Page 1 of 1

It is certified that error appears in the above-identified patent and that said Letters Patent is hereby corrected as shown below:

In column 16, line 47, in Claim 8, after "plurality" insert -- of sessions --.

In column 17, line 7, in Claim 11, delete "sessions;" and insert -- sessions: --, therefor.

In column 17, line 8, in Claim 11, delete "sessions;" and insert -- sessions: --, therefor.

In column 18, line 4, in Claim 18, after "computer" delete "readable".

Signed and Sealed this  
Twenty-fifth Day of January, 2011

David J. Kappos  
*Director of the United States Patent and Trademark Office*